United States Patent [19]

Kuchiki

[11] Patent Number: 4,888,534
[45] Date of Patent: Dec. 19, 1989

[54] NUMERICAL CONTROL APPARATUS

[75] Inventor: Kiyoshi Kuchiki, Aichi, Japan

[73] Assignee: Mitsubishi Denki Kabushiki Kaisha, Tokyo, Japan

[21] Appl. No.: 305,054

[22] Filed: Feb. 2, 1989

[30] Foreign Application Priority Data

Feb. 2, 1988 [JP] Japan ................................. 63-22220

[51] Int. Cl.$^4$ ............................................. G05B 19/10
[52] U.S. Cl. .................................... 318/567; 318/562; 318/600; 364/474.01
[58] Field of Search ....................... 318/567, 562, 600; 364/474.01

[56] References Cited

U.S. PATENT DOCUMENTS 4,197,490 4/1980 Kimura et al. ................... 318/600 X
4,631,684 12/1986 Akasofu et al. .................... 364/474

Primary Examiner—William M. Shoop, Jr.
Assistant Examiner—Saul M. Bergmann
Attorney, Agent, or Firm—Sughrue, Mion, Zinn, Macpeak and Seas

[57] ABSTRACT

A numerical control can be performed on one or more independently controllable objects on the basis of existence of such objects and the control itself is performed selectively on the axis and other objects which are not axes. Therefore, it is possible to control one to all of various objects which are to be operated simultaneously independently, by means of a single numerical control apparatus. Thus, a plurality of objects can be controlled independently from other objects, resulting in high producibility of products.

5 Claims, 6 Drawing Sheets

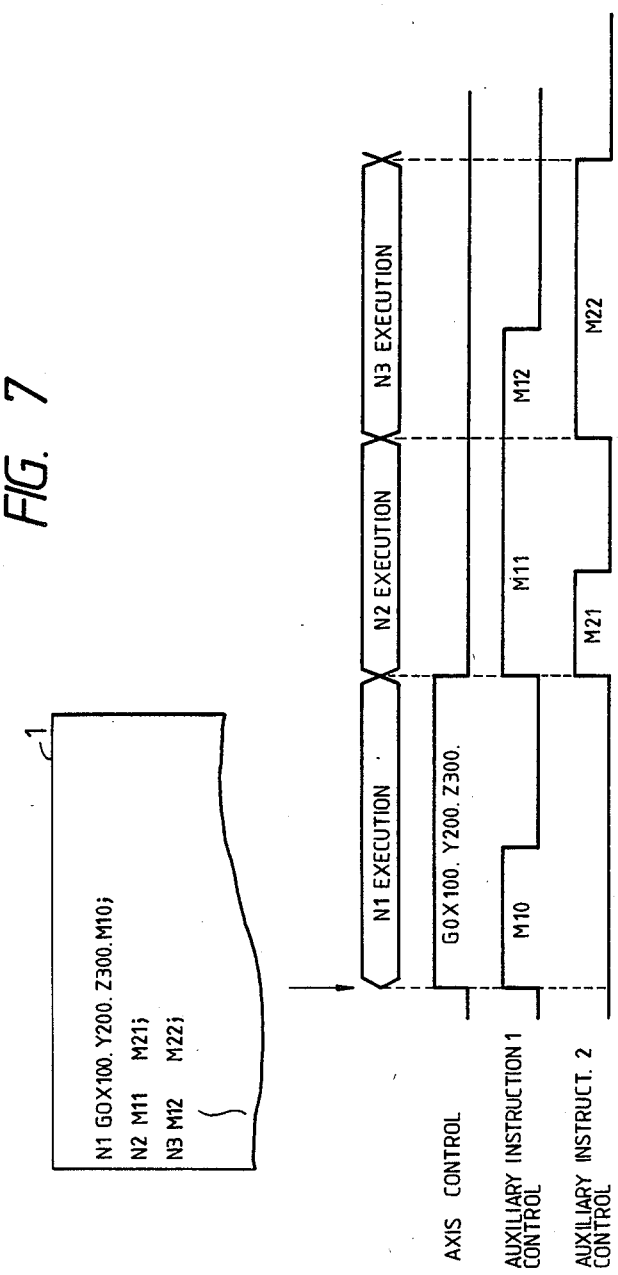

NUMERICAL CONTROL APPARATUS

BACKGROUND OF THE INVENTION

The present invention relates to a numerical control apparatus for controlling an operation of a machine tool.

Typical examples of a conventional numerical control (NC) apparatus are shown in FIGS. 5 and 6. In FIG. 5, control objects to be controlled by a single control instruction are an axis control and two MST controls and, in FIG. 6, control objects to be controlled by two control instructions are two axis controls and two MST controls.

In FIG. 5, 1a depicts the control instruction for the control objects 2, 3 a numerical control apparatus responsive to the control instruction for controlling the control objects, 4 an instruction decoder, 5 an axis control circuit responsive to a portion of the instruction concerning movement of an axis for controlling movement of the axis, 6 an auxiliary instruction control circuit for controlling an auxiliary instruction M, a main spindle instruction S and a tool instruction T, etc., 7a a control object to be axis controlled by the axis control circuit and 8a and 8b independently movable objects to be controlled by the auxiliary instruction control circuit.

Each control instruction i for controlling objects is prepared as a machining program and is decoded block by block by the instruction decoder circuit 4 to perform a numerical computation so that data of the axis control instruction and auxiliary instructions (MST instructions) which have no relation to the axis control are obtained. In the axis control circuit 5, an interpolation and pulse distribution are performed on the basis of respective axis movement data, speed data and data of the kind of interpolation among instruction data of the axis control to drive a servo motor through a drive amplifier to thereby control the axis control objects 7a. The auxiliary instruction data are processed individually in the auxiliary instruction control circuit 6 on tha basis of the data of the M instruction, the S instruction and the T instruction and control the auxiliary instruction control objects (8a) and (8b) through mechanical input/output interface. It should be noted that, only after the axis control and the auxiliary instruction control of a block are completed, a control of a subsequent block can be done.

FIG. 7 is a time chart showing this control. In FIG. 7, M10, M11 and M12 of the auxiliary instruction 1 and M21 and M22 of the auxiliary instruction 2 can be executed individually. However, when they are instructed in the same block, a next block can not be executed unless the auxiliary instructions 1 and 2 are completed. Therefore, an execution of a block N3 can not be done unless the M11 instruction completes even if the M21 instruction is completed.

In FIG. 6 in which components depicted by same reference numerals as those used in FIG. 5 are identical to the components in FIG. 5, respectively, a numerical control apparatus 3 includes a pair of control portions 3a and 3b which are responsive to mutually independent control instructions 1a and 1b, respectively. Each control portion comprises an instruction decoder circuit 4, an axis control circuit 5 and an auxiliary instruction control circuit 6, which are identical to those components 4, 5 and 6 of the numerical control apparatus 3 shown in FIG. 5 and operate similarly. The control portion 3a controls an axis control object 7a and an auxiliary instruction control object 8a and the control portion 3b controls an axis control object 7b and an auxiliary instruction control object 8b. In this construction, two pairs of the axis and the auxiliary instruction can be controlled separately. However, the control portion 3b can not control the auxiliary instruction alone. When it is desired to operate either of the control portion, it is necessary to modify it such that it functions like the apparatus shown in FIG. 5.

In either the apparatus shown in FIG. 5 or that shown in FIG. 6, it is impossible to control two or more auxiliary instructions independently from others, resulting in an increase of execution time. Such control may be possible in an apparatus having two or more control portions, only when there is an object to be axis-controlled. Further, when it is desired to add an object which is to be controlled independently from others, it is necessary to modify the construction of the control apparatus itself completely. This means that a flexibility of the control apparatus for change of the control object is very low.

SUMMARY OF THE INVENTION

An object of the present invention is to provide a numerical control apparatus capable of performing an arbitrary number of auxiliary instruction controls independently from others and of controlling any number of axes and auxiliary instructions which can be controlled independently from each other.

The numerical control apparatus according to the present invention includes a plurality of control portions each having a discrimination circuit for discriminating between the axis and the auxiliary instruction so that the auxiliary instruction is seperetely controlled and a control instruction allocation circuit for allocating control instruction to one of the control portions which is associated with an object to be controlled thereby.

The discrimination circuit is adapted to judge whether an output of an instruction decoder circuit is an axis control instruction or an auxiliary instruction, upon which it decides an axis control or auxiliary instruction control is performed. The control instruction allocation circuit functions as a center portion for determining one of the control portions by which the control instruction is to be processed.

BRIEF DESCRIPTION OF THE DRAWING

FIG. 7 is a time chart showing a control to be performed in the apparatus shown in FIG. 5.

DETAILED DESCRIPTION OF THE PREFERRED EMBODIMENT

Figure 1:
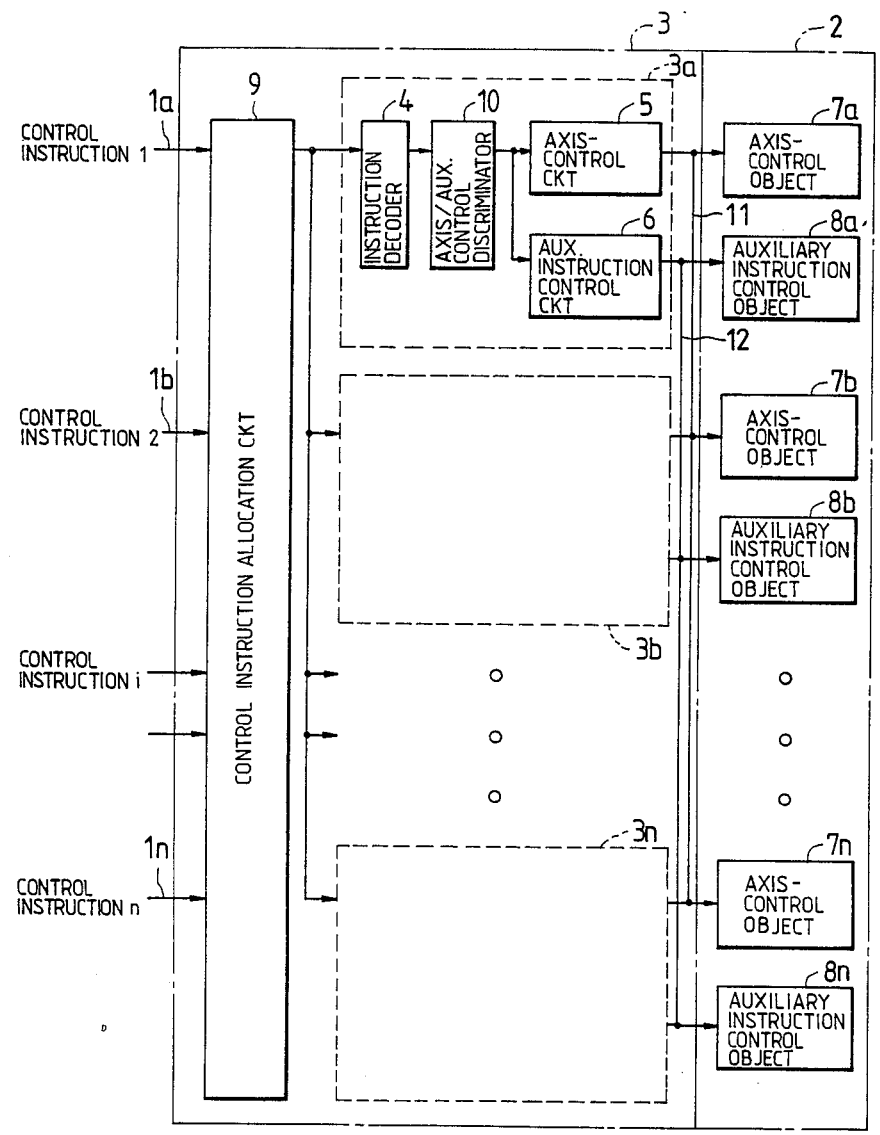
FIG. 1 shows a construction of a numerical control apparatus according to an embodiment of the present invention.

In FIG. 1, an embodiment of the present invention comprises an object portion 2 including a plurality of objects 7a, 7b ... 7n, 8a, 8b ... 8n and a numerical control apparatus 3 including a plurality of control portions 3a, 3b, ..., 3n and a control instruction allocation circuit 9 having inputs 1a, 1b, ..., 1n to which control instructions 1, 2 ..., n are supplied. Each control portion includes an instruction decoder circuit 4 having an input connected to an output of the control instruction allocation circuit 9, an axis/auxiliary control discrimination circuit 10 having an input connected to the instruction decoder circuit 9, an axis control circuit 5 and an auxiliary instruction control circuit 6. An output of the axis/auxiliary control circuit 10 is connected to inputs of the axis control circuit 5 and the auxiliary instruction control circuit 6. The axis/auxiliary instruction discrimination circuit 10 receives a decoded instruction from the instruction decoder 4 and functions to determine whether the instruction is an axis control instruction or an auxiliary instruction and to feed it to the axis control circuit 5 when it is the shaft control instrucion or to the auxiliary instruction control circuit 6 when it is the auxiliary instruction. The auxiliary instruction may include the auxiliary instruction M, a main spindle instruction S and a tool instruction T, etc. The axis control circuit 5 is connected to a member to be shaft-controlled and the auxiliary instruction control circuit 6 is connected to a member to be controlled by the auxiliary instruction.

In operation, the control instruction 1 for the members 7a and 8a to be controlled is prepared as a discrete machining program. This is true for each of other control instructions 2, ..., n. The numerical control apparatus receives at least one of these control instructions which is processed by the control instruction allocation circuit 9. The control instruction allocation circuit 9 decides the control portion or portions which process one or more of such control instructions and allocates the latter to the decided control portion or portions. When the objects to be controlled are only the objects 7a and 8a, the control portion 3a is adapted to receive only the control instruction 1a and executes it. When there are all of the control instructions 1 to n, the circuit 9 allocates them to the control portions 3a, 3b, ..., 3n, respectively. The objects to be controlled are not always successive. That is, the allocation circuit 9 checks on existence of object one by one and, if there is any, it responds toa control instruction related thereto to actuate a corresponding control portion. The instruction decoder 4 of the control portion or portions actuated by the allocation circuit 9 decodes the corresponding machining program of the control instruction block by block to perform a numerical calculation. A result of calculation is classified into data concerning movement of an axis and data concerning to auxiliary instruction (MST instruction) which has no relation to the axis control. Such data may include an instruction flag useful to immediately decide whether or not the axis control instruction and/or the auxiliary instruction are included in the data. These data are fed to the axis/auxiliary instruction control decision circuit 10. An object to be controlled is not always to be axis-controlled. Therefore, when there is no object to be axis-controlled, i.e., the number of control axes is 0, the axis control circuit is not interrogated and only the auxiliary instruction is fed to the auxiliary instruction control circuit 6. As mentioned, the existence of the axis instruction or the auxiliary instruction is determined by referring to the instruction flag prepared in the instruction decoder circuit 4. Thereafter, the processing is performed in the axis control circuit 5 and the auxiliary instruction control circuit 6, respectively, to control the objects to be controlled thereby, in the conventional manner.

Figure 2:
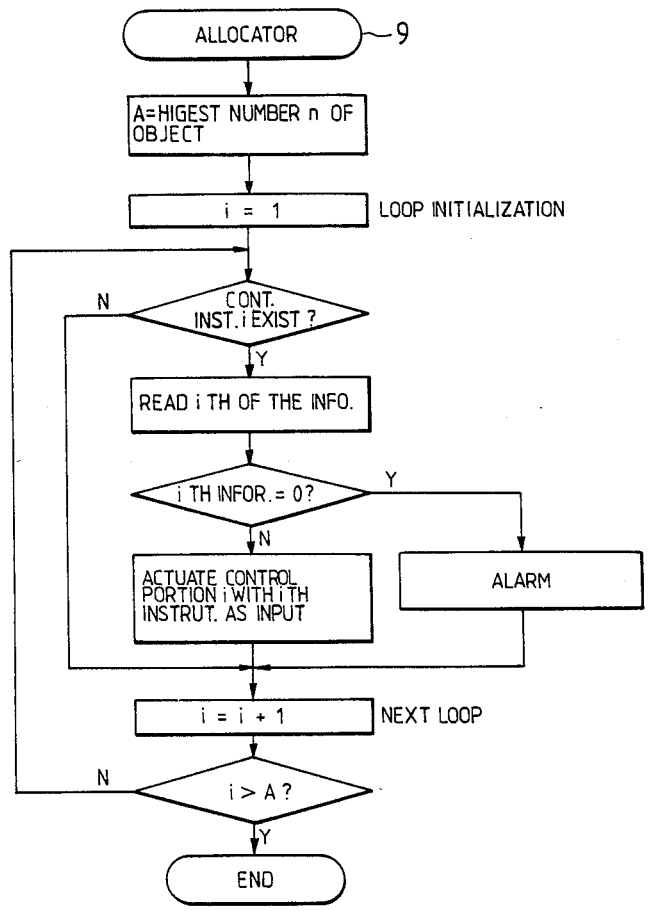
FIG. 2 is a flow chart showing an operation of a control instruction allocation circuit.
Figure 3:
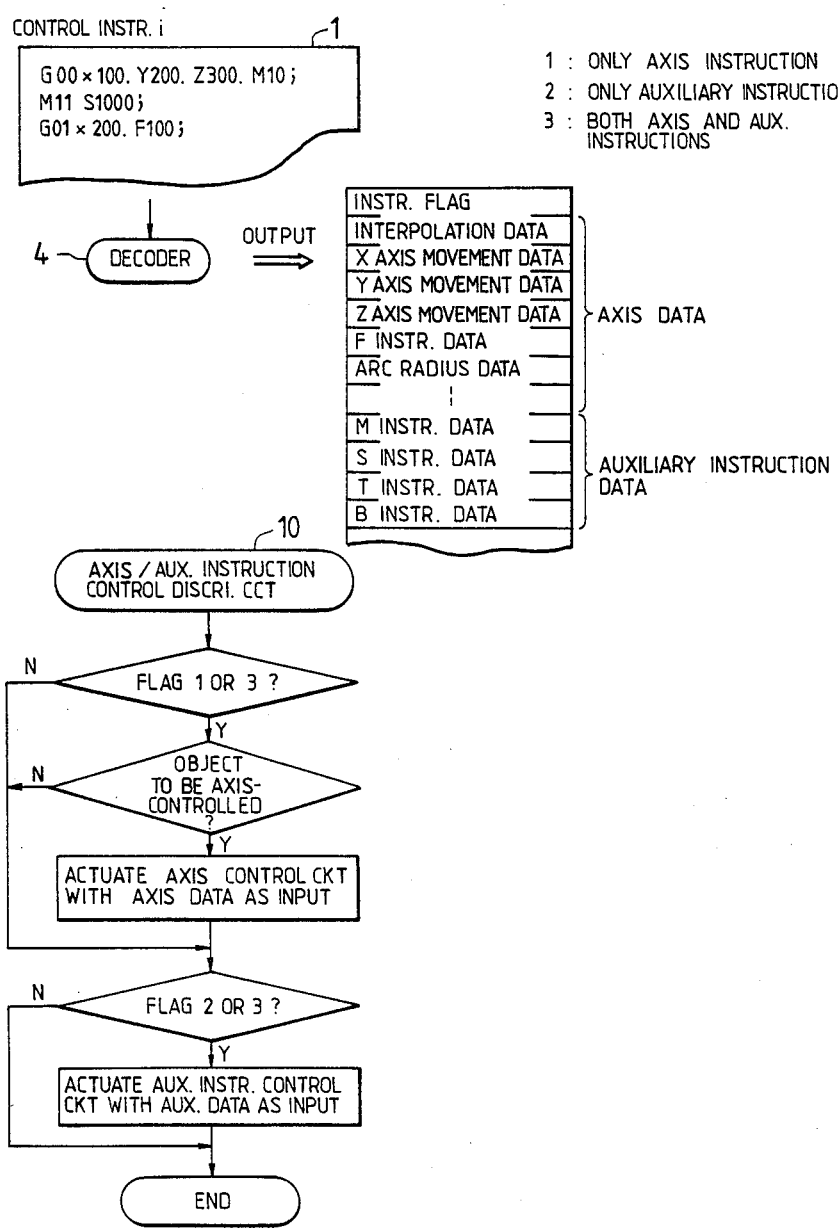
FIG. 3 is a flow chart showing an operation of an axis auxiliary instruction control circuit.
Figure 4:
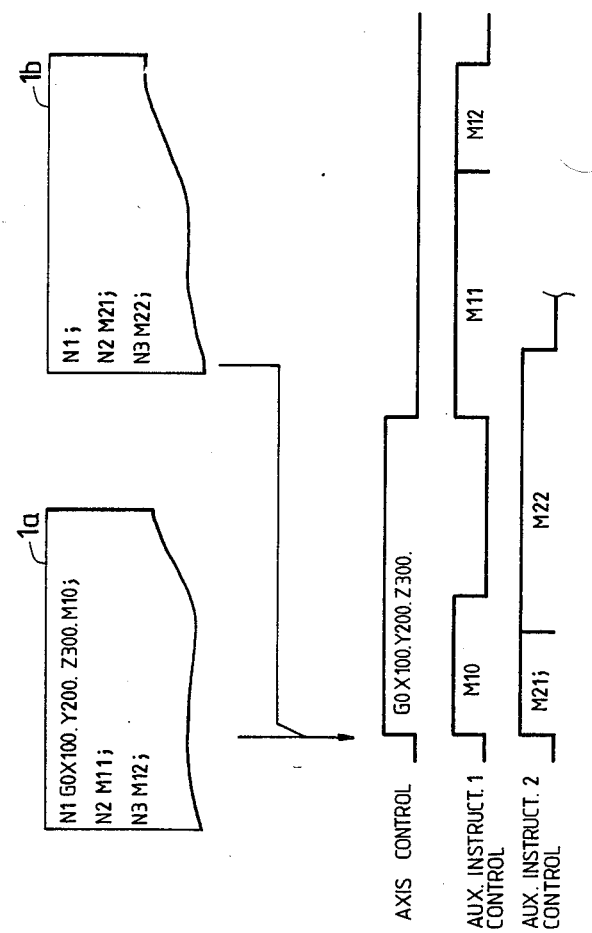
FIG. 4 is a time chart of controls of auxiliary instructions 1 and 2.
Figure 5:
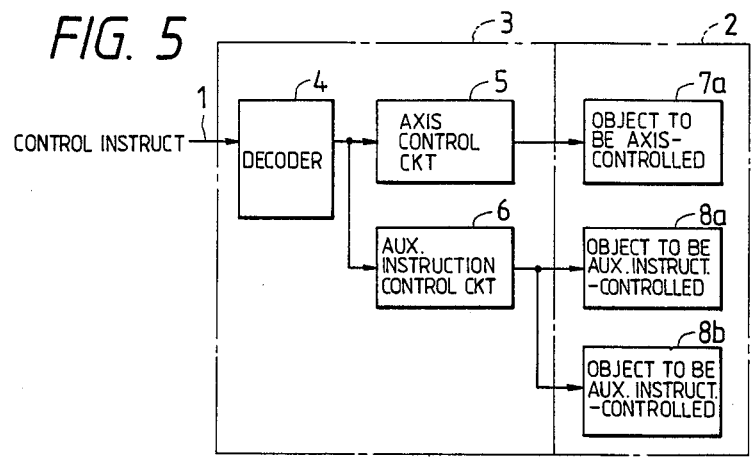
FIGS. 5 and 6 show constructions of typical examples of a conventional numerical control apparatus respectively.
Figure 6:
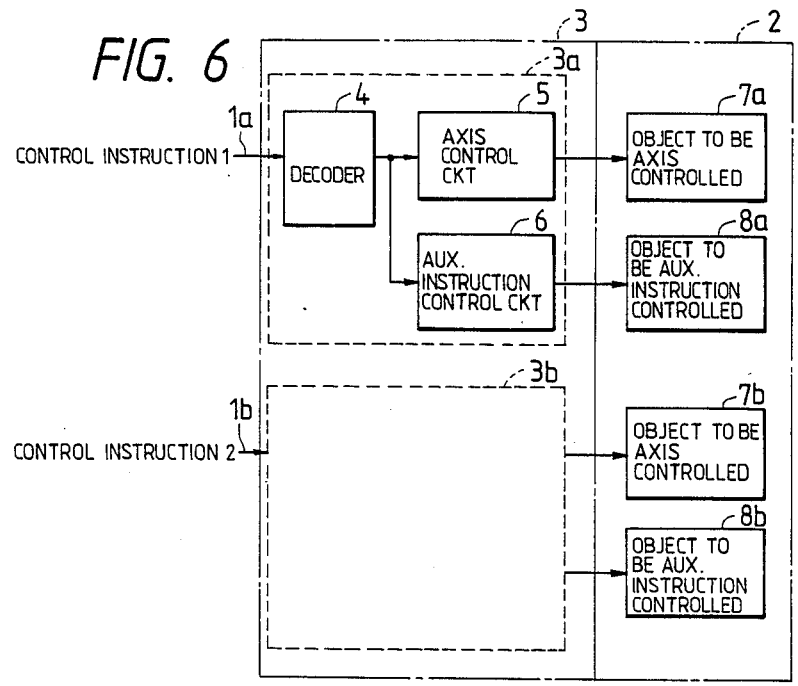

The control operations of the control instruction allocation circuit 9 and the axis/auxiliary instruction control discrimination circuit 10 are shown by the flow charts in FIGS. 2 and 3. FIG. 4 is a time chart of the present invention which is to be compared with FIG. 7.

Though, in the described embodiment, a control instruction i instructs an object i to be controlled through a control portion i, it is possible to assign another object for the instruction i. Further, it is possible to control a plurality of objects by the instruction i.

As described, according to the present invention, a control can be performed on one or more independently controllable objects on the basis of existence of such objects and the control itself is performed selectively on the axis and other objects which are not axes. Therefore, it is possible to control one to all of various objects which are to be operated simultaneously independently, by means of a single numerical control apparatus. Thus, a plurality of objects can be controlled independently from other objects, resulting in high producibility of products.

What is claimed is:

1. A numerical control apparatus for controlling at least one pair of a first object (7) having an axis to be controlled by an axis control instruction and a second object (8) having a variable member other than an axis to be controlled by an auxiliary control instruction, comprising: a control instruction allocation circuit (9) for deciding an existence of said pair of objects and allocating said axis control instruction and said auxiliary control instruction thereto, and a control portion (3a) responsive to said axis control instruction and said auxiliary control instruction for controlling said pair of objects.

2. The numerical control apparatus as claimed in claim 1, wherein said control portion selectively controls only said first object.

3. The numerical control apparatus as claimed in claim 1, wherein said control portion selectively controls only said second object.

4. The numerical control apparatus as claimed in claim 1, wherein said control portion comprises an axis-/auxiliary instruction control discrimination circuit (10) capable of selecting either or both of said axis control instruction and said auxiliary control instruction such that an arbitrary combination of controls can be performed.

5. The numerical control apparatus as claimed in claims 1, 2, 3 or 4, wherein a plurality of pairs of said first object and said second object are provided and a corresponding number of said control portions operate to select one or more of said pairs and control each said pair simultaneously and separately.

* * * * *